United States Patent Office 2,713,659
Patented July 19, 1955

2,713,659

BATTERY CHARGING CONTROL

Lauren L. Johnson, Westchester, Ill., assignor to General Motors Corporation, Detroit, Mich., a corporation of Delaware Application January 4, 1954, Serial No. 401,752

5 Claims. (Cl. 320—40)

This invention relates generally to cut-out relay controls of the type generally used between chargeable storage batteries and charging generators.

The invention is more particularly concerned with a novel cut-out relay control in which the relay is always magnetically held in either its dropped out or picked up positions thereby eliminating the necessity for springs or other types of mechanical biasing means.

For a further understanding of this invention reference may be had to the accompanying detailed description and drawing which represents a schematic diagram of this new battery charging relay cut-out control.

Referring now to the schematic diagram, a battery BAT is shown which is connected across a suitable load, such as L. Adapted to be connected across the battery BAT and the load L is a charging generator G having a suitable exciting field F. It will be noted that the low voltage or negative sides of the generator G and the battery BAT are suitably connected together by conductors 2 and 3. This is not necessary to achieve the desired result, however, since the invention would work equally well if the low voltage sides of generator and battery were connected to a common ground.

The high voltage sides of the generator G and the battery BAT are adapted to be connected together by means of a circuit including a conductor 4, the interlock 6 of a closing relay CL, a resistor R1, a conductor 8, and a conductor 10. When the relay CL is energized its interlock 6 will close to connect the generator G across the battery BAT and also across the load L. The means for closing the relay CL comprises a novel cut-out relay control which will now be described in detail.

The cut-out relay has been designated CO and, as may be observed from the drawing, is provided with a pair of energizing windings 12 and 14. Winding 14 is connected in series with a rectifier 16 across the battery BAT by means of conductors 10, 8, and 18; the rectifier 16; conductors 20, 22, 24, and 26; a resistor R2 and conductors 28, 2, and 3. Similarly, energizing coil 12 is connected in series with a rectifier 30 across the generator G by means of conductors 4, 32, 34; a resistor R3; conductor 36; conductors 24 and 26; resistor R2; and conductors 28 and 2, returning to the negative side of the generator G.

By placing rectifier 16 in series with the energizing winding 14 current can flow through energizing winding 14 in only one direction, which is from conductor 22 to conductor 24. Similarly, by placing rectifier 30 in series with energizing coil 12 current can flow through energizing coil 12 only from conductor 36 to conductor 34. It will be noted, however, that because of the manner in which the coils 12 and 14 are wound and by reason of the direction of current flow therethrough these coils will generate magnetic fields of opposite polarity. In other words, if the relay winding 12 by reason of the current flow therethrough generates a magnetic field of predetermined greater magnitude than that generated by winding 14 the relay CO will be biased to the left as viewed in the diagram. On the other hand, if the magnetic field generated by energizing winding 14 is greater than that generated by winding 12 the relay will be biased to the right as viewed in the diagram. With relay CO biased to the right its interlock 38 closes a circuit to energize a signal lamp 40. This circuit includes the positive side of the battery BAT; conductors 10, 8, and 18; rectifier 16; conductor 20; interlock 38; a conductor 42; lamp 40; a conductor 44; and conductors 2 and 3, returning to the negative side of the battery BAT. If relay CO is biased to the left its interlock 39 will close a circuit energizing the relay CL to thereby connect the generator G across the battery BAT and the load L in the aforementioned manner. This circuit includes the high voltage side of the generator G, conductors 4 and 32, rectifier 30, conductors 34 and 46, the energizing coil of relay CL, a conductor 48, the interlock 39, conductor 50, and conductor 2, returning to the low voltage side of the generator G.

The operation of this cut-out relay control is as follows:

Assuming generator G to be turning so that its generated voltage is less than that of battery BAT the current flow which takes place through winding 14 will generate a magnetic field greater than that generated by winding 12 and relay CO will be biased to the right so that its interlock 38 is closed. This will energize the signal lamp 40 to indicate that the battery BAT is not being charged and that the generator G is disconnected therefrom and also from the load L. If the voltage of the generator G, however, should exceed that of battery BAT by a predetermined amount the current flow through coil 12 will generate a magnetic field sufficient to overcome that generated by winding 14 under the influence of the battery voltage. This will cause the relay CO to move to the left opening its interlock 38 and closing its interlock 39. Closure of interlock 39, as mentioned, energizes the relay CL and connects the generator G across the battery BAT and the load L.

It will be appreciated that the generator G will remain connected across the battery BAT and also the load L as long as its voltage exceeds that of the battery by predetermined value. If, however, the voltage generator G should drop below the predetermined value, energizing winding 14 of relay CO will again generate the greater magnetic field and cause relay CO to move to the right, opening the interlock 39 to de-energize relay CL and disconnect the generator from the battery and the load so as not to discharge the battery.

The rectifier 16 must block the highest differential voltage between the generator and the battery, otherwise the current would tend to flow from the generator through winding 12 and winding 14 to the positive side of the battery rather than through the resistor R2 to the low voltage side of the generator. The rectifier 30 must be capable of blocking the highest battery voltage occurring when the generator is shut down, otherwise current would tend to flow from winding 14 into winding 12 and through the generator to the negative side of the battery rather than through resistor R2.

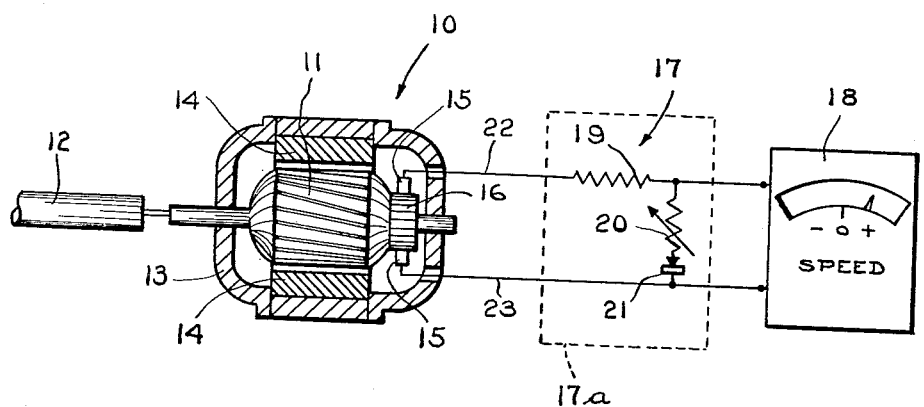

Values for resistors R1, R2, R3 may be selected to obtain the desired voltage differentials to which the cut-out relay control will respond. It should be mentioned, however, that the presence of some resistive means R1, regardless of its value, is necessary to achieve complete operation of the relay cut-out control. Without resistance R1, relay CO would still connect the generator G across battery BAT upon predetermined voltage differentials. Immediately upon doing so, however, the voltage impressed across the circuit including rectifier 30 and winding 12 and across the circuit including rectifier 16 and winding 14 would be the same. Such a condition would make the ratio of the ampere-turns of windings 12 and